(12) United States Patent
Wolters et al.

(10) Patent No.: US 6,400,705 B1
(45) Date of Patent: Jun. 4, 2002

(54) METHOD TO DETERMINE AN ACCESS FREQUENCY BAND, A HEAD-END AND A FIRST TERMINAL REALIZING SUCH A METHOD AND A COMMUNICATION ACCESS NETWORK INCLUDING SUCH A HEAD-END AND SUCH A TERMINAL

(75) Inventors: Robert Peter Christina Wolters, AC Montfort; Cornelis Krijntjes, MP Bergen op Zoom, both of (NL)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/113,958

(22) Filed: Jul. 10, 1998

(30) Foreign Application Priority Data

Jul. 10, 1997 (EP) .............................. 97401709

(51) Int. Cl.$^7$ .............................. H04B 7/208
(52) U.S. Cl. .................. 370/348; 370/347; 725/120
(58) Field of Search ................. 370/347, 348, 370/331, 436, 480, 481, 482, 485, 486, 487; 725/120

(56) References Cited

U.S. PATENT DOCUMENTS

| | | | | |
|---|---|---|---|---|
| 4,707,828 A | * | 11/1987 | Yamada | 370/447 |
| 5,563,883 A | | 10/1996 | Cheng | |
| 5,719,872 A | * | 2/1998 | Dubberly et al. | 370/487 |
| 5,862,451 A | * | 1/1999 | Grau et al. | 455/5.1 |
| 6,181,687 B1 | * | 1/2001 | Bisdikian | 370/347 |

FOREIGN PATENT DOCUMENTS

| | | |
|---|---|---|
| DE | 4407831 | 9/1995 |
| WO | 9720407 | 6/1997 |

OTHER PUBLICATIONS

IEEE802.14–95/156, published in Nov. 6, 1995, "Protocol Stack and Topology for Medium Access controller (MAC Level Management Protocol (MLMP) and Medium Access Controller (MAC Level Access Protocol (MLAP)".

* cited by examiner

*Primary Examiner*—Ajit Patel
*Assistant Examiner*—T Tran
(74) *Attorney, Agent, or Firm*—Ware, Fressola, Van Der Sluys & Adolphson LLP (57) ABSTRACT

A method to determine an access frequency band in a communication access network. The communication access network includes terminals and a head-end which includes transceivers. The head-end is downstream coupled to each one of the terminals via a downstream common link and a tree-like distributive network. Each one of the transceiver provides to a combiner, included in the head-end, a downstream signal in a frequency band associated with the first association. The access frequency band is one of the frequency bands to be used by the terminal to filter out of the downstream modulated signal one of the downstream signals provided by an access transceiver which is one of the transceivers in order to establish a communication between the access transceiver an the terminal. And the determining by the terminal with the start frequency bands according to second association an upstream frequency bands.

9 Claims, 2 Drawing Sheets

METHOD TO DETERMINE AN ACCESS FREQUENCY BAND, A HEAD-END AND A FIRST TERMINAL REALIZING SUCH A METHOD AND A COMMUNICATION ACCESS NETWORK INCLUDING SUCH A HEAD-END AND SUCH A TERMINAL

TECHNICAL FIELD

The present invention relates to a method to determine an access frequency band in a communication access network, the communication access network including a plurality of terminals and a head-end which includes a plurality of transceivers, the head-end being downstream coupled to each one of said plurality of terminals via a downstream common link and a tree-like distributive network. It is also directed to, a head-end and a first terminal to realize such a method and a communication access network including such a head-end or such a first.

BACKGROUND OF THE INVENTION

Such a communication access network including such a first terminal and such a head-end is already known in the art, e.g. from the submission of "IEEE802. 14–95/156, published in Nov. 6, 1995, Protocol Stock and Topology Assumptions for Medium Access Controller (MAC) Level Management Protocol (MLMP) and Medium Access Controller (MAC) Level Access Protocol (MLAP)". This submission is provided by the IEEE Project 802.14 Working Group/Standard Protocol for Cable—TV Based Broadband Communication Network. Therein a few topology's of multiple communication access networks are introduced, more particular on pages 11, 13 and 15.

In order to indicate the background art which can be regarded as useful for understanding the invention a description is given of the necessary features of the topology of such a communication access network wherein the invention is used.

Such a communication access network includes a head-end and a plurality of terminals. The head-end and each one of the plurality of terminals are communicating to each other by transmitting downstream and upstream information to each other.

In the downstream direction, the head-end is coupled to the plurality of terminals via a downstream common link and a tree-like distributive network. The head-end includes a plurality of transceivers. Each transceiver receives information from the network which is coupled to this communication access network. Such kind of network is e.g. an asynchronous transfer mode network or a synchronous digital hierarchical network and provides information of e.g. a multimedia server or from a router to an internet provider or information from an other access network. It has to be remarked that the kind of network coupled to a communication access network wherein the invention is used and the kind of information provided by the network coupled to the communication access network of the invention are both no restriction to the invention as such. The aim is that each transceiver included in the head-end receives information. The information received by one of the transceivers is modulated into a predefined frequency bond whereby this transceiver provides a downstream signal to a combiner. The predefined frequency band is associated to this transceiver with a so called predetermined first association. In this way the combiner receives a plurality of downstream signals, each one being provided in a different frequency band. The combiner combines all the downstream signals together into one downstream modulated signal. This downstream modulated signal is broadcasted from the head-end to the plurality of terminals.

In the upstream direction each terminal e.g. a first terminal is coupled to at least one receiving transceiver whereof each one is a transceiver as described above. The at least one receiving transceiver is upstream coupled via one common upstream link and at least one individual upstream sublink e.g. a common upstream link from the first terminal to a splitter included in the head-end and at least one individual upstream sublink from the splitter to each receiving transceiver.

It has to be remarked that a plurality of terminals might have upstream access to one and the same receiving transceiver via one and the same common upstream link whereby in a multiple access network terminator a multiple access system e.g. a time division multiple access system or a frequency division multiple access system, is used to give access to this upstream link for each one of the plurality of terminals. However this feature is not a necessary feature.

Since a terminal included in a communication access network as described above is only able to transmit information to the at least one receiving transceiver whereto this terminal is upstream coupled, this terminal needs to know which downstream frequency band, called hereafter the access frequency band, belongs to its access transceiver being one of its receiving transceivers in order to be able to filter out of the modulated downstream signal a downstream signal with this access frequency band and to establish a communication with this access transceiver. Indeed, without prior knowledge of the configuration of the transceivers i.e. the assignment of the downstream frequency bands to the transceivers, a situation can occur in which a terminal will react on a downstream signal included in the downstream modulated signal coming from another transceiver rather than the at least one that is receiving the upstream information of the terminal. Such a situation can cause an interruption or interference of other transmissions being performed by another terminal connected to another transceiver. Such situations should be prevented. By using the access frequency band of its access transceiver to filter out of the received modulated downstream signal a downstream signal which is associated to its access transceiver, the terminal is enabled to establish a communication with its access transceiver.

An obvious way to give this knowledge to a terminal of an end-user who likes to establish a communication and to have access to the communication access network is to tune the filter of the terminal to the access frequency band according to information given to the end-user by e.g. an operator of the communication access network at e.g. installation time of the terminal.

However, a problem outstanding with this method to determine an access frequency band is that each terminal has a different installation configuration according to its access transceiver whereto the terminal is upstream coupled and via which the terminal obtains access to the communication access network. In the event when e.g. such a communication access network needs to be reconfigured due to e.g. an increasing number of terminals coupled to the communication access network and an increasing number of transceivers, the predetermined first association changes and new different downstream frequency bands have to be given to the end-users and each terminal needs to be reconfigured, i.e. tuned on a different new access frequency band.

SUMMARY OF THE INVENTION

An object of the present invention is to provide a method to determine an access frequency band to be used by a first terminal such as the above known method but which has not the above drawback of a different installation configuration for each terminal at reconfiguration time of the communication access network.

According to the invention, this object is achieved by a method to determine an access frequency band in a communication access network, the communication access network including a plurality of terminals and a head-end which includes a plurality of transceivers, the head-end being downstream coupled to each one of the plurality of terminals via a downstream common link and a tree-like distributive network, each one of the plurality of transceivers providing to a combiner included in the head-end one of a plurality of downstream signals in one of a plurality of frequency bands associated by means of a predetermined first association to the one of the plurality of transceivers, the plurality of downstream signals being together combined by the combiner into a downstream modulated signal, the downstream modulated signal being broadcasted from the head-end to the plurality of terminals, a first one of the plurality of terminals being upstream coupled to at least one receiving transceiver being one of the plurality of transceivers via a common upstream link and at least one upstream sublink, the access frequency band being one of the plurality of frequency bands to be used by the first terminal to filter out of the downstream modulated signal one of the downstream signals provided by an access transceiver being one of the plurality of transceivers, in order to establish a communication between the access transceiver and the first terminal wherein the method includes the steps of; a) choosing by the first terminal out of the plurality of frequency bands a start frequency band; b) determining by the first terminal with the start frequency band and according to a predetermined second association an upstream frequency band, the upstream frequency band being one of a plurality of upstream frequency bands whereof each one is associated by means of the predetermined second association to one of the plurality of frequency bands; c) transmitting by the first terminal within the upstream frequency band an access request signal to the at least one receiving transceiver; d) filtering by the at least one receiving transceiver out of incoming signals including the access request signal within a predetermined one of the plurality of upstream frequency bands according to the predetermined first association and the predetermined second association and thereby providing a filtered signal; e) in the event that the upstream frequency band is substantially equal to one of the plurality of upstream frequency bands used by a first of the at least one receiving transceiver in the step d) whereby the filtered signal substantially equals the access request signal and the first receiving transceiver constitutes the access transceiver, confirming to the first terminal by the head-end that the start frequency band constitutes the access frequency band; and in the event that after a predetermined time from sending the access request signal without receiving of the confirmation of the step e), repeating the steps of the method with another start frequency band.

This object is also directed to a head-end for inclusion in a communication access network and adapted to provide an access frequency band, the head-end including a plurality of transceivers and being downstream coupled to each one of a plurality of terminals included in the communication access network via a downstream common link and a tree-like distributive network, each one of the plurality of transceivers being adapted to provide to a combiner included in the head-end one of a plurality of downstream signals within one of a plurality of frequency bands associated with a predetermined first association to the one of the plurality of transceivers, the combiner being adapted to combine the plurality of downstream signals together into a downstream modulated signal which is broadcasted from the head-end to the plurality of terminals, a first one of the plurality of terminals being upstream coupled to at least one receiving transceiver which is one of the plurality of transceivers via a common upstream link and at least one upstream sublink, the access frequency band being of the plurality of frequency bands to be used by the first terminal to filter out of the downstream modulated signal one of the downstream signals provided by an access transceiver which is one of the plurality of transceivers in order to establish a communication between the access transceiver and the first terminal, wherein the head-end further includes at least one filter means whereof each one being included in the at least one receiving transceiver to filter out of incoming signals including an access request signal within a predetermined one of a plurality of upstream frequency bands according to the predetermined first association means and a predetermined second association means and to provide thereby a filtered signal, the access request signal being transmitted by the first terminal within an upstream frequency band to the at least one receiving transceiver, the upstream frequency band being one of a plurality of upstream frequency bands whereof each one is associated by means of the predetermined second association to one of the plurality of frequency bands and being determined by the first terminal with a start frequency chosen by the first terminal out of the plurality of frequency bands and according to the predetermined second association; and confirmation means to confirm, in the event that the upstream frequency band is substantially equal to one of the plurality of upstream frequency bands used by a first of the at least one receiving transceiver to filter the incoming signals whereby the filtered signal substantially equals to the access request signal and the first receiving transceiver constitutes the access transceiver, to the first terminal by the head-end that the start frequency band constitutes the access frequency band; and to enable the first terminal, in the event that after a predetermined time from sending by the first terminal the access request signal without receiving the confirmation from the head-end to choose another start frequency band.

This object is still further achieved by a first terminal for inclusion in a communication access network and adapted to determine an access frequency band, the first terminal being a first one of a plurality of terminals included in the communication access network, the communication access network including a head-end which includes a plurality of transceivers and which is downstream coupled to each one of the plurality of terminals via a downstream common link and a tree-like distributive network, each one of the plurality of transceivers is adapted to provide one of a plurality of downstream signals to a combiner included in head-end within one of a plurality of frequency bands associated to the one of the plurality of transceivers by means of a predetermined first association, the combiner being adapted to combine the plurality of downstream signals together into a downstream modulated signal which is broadcasted from the head-end to the plurality of terminals, the first terminal being upstream coupled to at least one receiving transceiver which is one of the plurality of via a common upstream link and at least one upstream sublink, the access frequency band being one of the plurality of frequency bands to be used by the first terminal to filter out of the downstream modulated signal one of the downstream signals provided by an access transceiver which is one of the plurality of transceivers in order to establish a communication between the access transceiver and the first terminal, wherein the first terminal further includes establishing means to choose out of the plurality of frequency bands a start frequency band; determining means to determine with the start frequency band and according to a predetermined second association an upstream frequency and, the upstream frequency band being one of a plurality of upstream frequency bands whereof each one is associated by means of the predetermined second association to one of the plurality of frequency bands; and transmitting means to transmit within the upstream frequency band an access request signal to the at least one receiving transceiver, to enable thereby the at least one receiving transceiver to filter out of incoming signals including the access request signal within a predetermined one of the plurality of upstream frequency bands according to the predetermined first association and to the predetermined second association and to provide a filtered signal, and to enable thereby the head-end, in the event that the upstream frequency band is substantially equal to one of the plurality of upstream frequency bands used by a first of the at least one receiving transceiver to filter the incoming signals whereby the filtered signal is substantially equal to the access request signal and whereby the first receiving transceiver constitutes the access transceiver, to confirm to the first terminal that the start frequency band constitutes the access frequency band; and repeating means to provide to the establishing means, in the event that after a predetermined time from sending the access request signal without receiving the confirmation from the head-end, a first control signal in order to enable the establishing means to choose another start frequency band.

This object is further achieved by a communication access network characterized in that the communication access network includes such a head-end and such a first terminal.

Indeed, in the event that such a first terminal wants to get access to such a communication access network, by performing the following steps:

a) choosing by the first terminal out of the frequency bands a start frequency band; and b) determining by the first terminal with the start frequency band and according to a predetermined second association an upstream frequency band whereby the upstream frequency band is one of a plurality of upstream frequency bands whereof each one is associated by means of the predetermined second association to one of the plurality of frequency bands; and c) transmitting by the first terminal within the upstream frequency band an access request signal to the at least one receiving transceiver; and d) filtering by the at least one receiving transceiver out of incoming signals including the access request signal within one of the upstream frequency bands according to the predetermined first association and the predetermined second association and thereby providing a filtered signal; and e) in the event that the upstream frequency band is substantially equal to one of the upstream frequency bands used by a first receiving transceiver in the previous step d) whereby the filtered signal substantially equals the access request signal and the first receiving transceiver constitutes the access transceiver, confirming to the first terminal by the head-end that the start frequency band constitutes the access frequency band;

f) in the event that after a predetermined time from sending access request signal without execution of the confirmation of the step e), repeating the steps of the method of the invention with another start frequency band; wherein the first terminal becomes aware of the access frequency band it has to use in order to receive the downstream signal coming from its access transceiver.

Moreover, at reconfiguration time of the communication access network whereby the predetermined first association changes, the filters of the receiving transceivers are tuned to another upstream frequency band according to the new predetermined first association and the predetermined second association. In this way the association of downstream frequency band to the upstream frequency band is adjusted in the head-end without having to provide reconfigured frequency band information to the end-users in order to tune its terminal to it.

It has to be remarked that in the event when the at least one receiving transceiver is only one transceiver, it is possible that a terminal has to repeat the steps of the method of the invention, each time with another start frequency band, as much as the number of available transceivers before having success. On the other hand, in the event when the at least one receiving transceiver equals the total number of transceivers, a terminal only has to execute the steps of the method of the invention once, before having success whereby the last step f) will never be true. Indeed, each available downstream frequency band is associated to one of each available upstream frequency bands used by a predefined receiving transceiver whereby using of any upstream frequency band for transmitting an access request signal returns always a matching following step e) of the method of the invention.

It has to be explained that in order to give access for a terminal to an access communication network and in order to establish a proper communication between the head-end and each one of a plurality of terminals some initialization steps have to be executed. Two kinds of multiple access are know in the art:

a fixed assignment multiple access system whereby a terminal has periodic access to a head-end; or a demand-assignment multiple access system whereby a terminal requests access to a head-end by e.g. reacting on a ranging grant which have been sent by this head-end.

In the event of a demand-assignment multiple access system, a ranging procedure has to be performed in order to provide to the head-end e.g. the knowledge of the identification of a terminal willing to log on to the access system. During such a ranging procedure some predefined downstream messages and upstream messages are exchanged between the head-end and the terminal.

A possible implementation of confirming to the first terminal by the head-end that the start frequency constitutes the access frequency is sending a confirmation signal to the terminal whereby the confirmation signal e.g. includes an identification of the first terminal provided by this first terminal in the access request signal.

Referring to the previous paragraphs of the ranging procedure and the possible implementation of exchanging the identification of the first terminal, an advantage of an additional feature of the method of the present invention becomes clear. Indeed, since the identification of the terminal has to be transmitted anyway, by including such an access request signal or a confirmation signal in such an upstream or downstream message, respectively, of a ranging procedure, less bits have to be transmitted in the access request signal and the confirmation signal.

It also has to be explained that choosing by the first terminal out of the plurality of frequency bands a start frequency band can be implemented in different manners e.g. at random whereby eventually the tried start frequencies are memorized in order not to be used anymore; or in a predefined sequence of the possible frequency bands. However it can also be avoided to start searching for a good start frequency each time the first terminal wants to get access to the access system. Indeed, in the event when the first terminal has determined the access frequency band during a previous access to the communication access system, this access frequency band can be stored in a memory of the first terminal. Herewith, when the first terminal is switched on, it is possible to check first the availability of a good start frequency band i.e. an access frequency band in the memory of the first terminal. In the event that such a good start frequency band is available it is not necessary to choose a start frequency band as described in step a) of the method of the present invention but the available good start frequency band can be used for the following steps of the method of the present invention. Only in the event that a reconfiguration of the access network took place between the time that the access frequency band was memorized by the first terminal and the time that this access frequency band is re-used by the first terminal as a good start frequency band the steps of the method of the invention will have to be repeated.

It should further be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
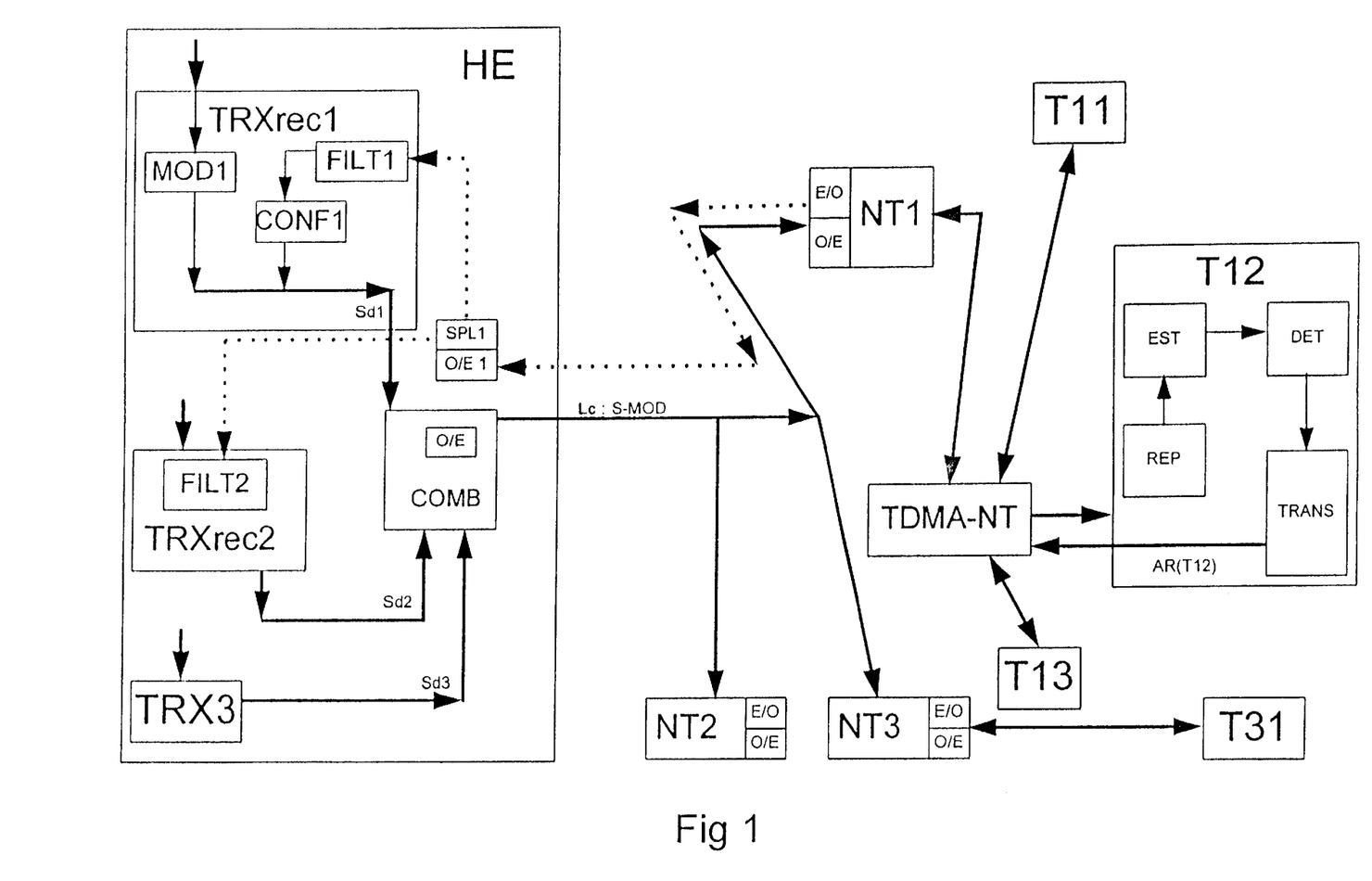
FIG. 1 represents a block scheme of an embodiment of a communication access network according to the present invention.

Referring to FIG. 1 a communication access network will be described. First, the access communication network will be described by means of a description of the functional blocks included in the access communication network. Based on this description, implementation of the functional blocks in the FIG. 1 will be obvious to a person skilled in the art and will therefor not be described in detail. In addition the principle working of the method of the invention will be described in further detail.

The access communication network shown in FIG. 1 is a hybrid fiber coax network and includes a head-end HE, a plurality of network terminators NT1, NT2 and NT3, a time division multiple access network terminator TDMA-NT and a plurality of terminals. In order not to overload the figure only a few terminals are shown i.e. those terminals T11, T12, T13, . . . , M31, . . . which are relevant to describe the principle working of the method of the invention.

First the links and functional blocks related to provide signals in the downstream direction will be explained, later on the upstream communication direction of the communication access network will be explained.

In the downstream direction, the head-end HE is coupled to the plurality of terminals via a downstream common link Lc and a tree-like distributive network. The tree like distributive network is shown in FIG. 1 with full lines with arrows in the downstream direction i.e. from the head-end HE, via one of the plurality of network terminators NT1, NT2, NT3 and via eventual the time division multiple access network terminator TDMA-NT to one of the plurality of terminals T11 , T12, T13, . . . , T31, . . . .

The head-end HE includes a plurality of transceivers TRX1, TRX2 and TRX3, a combiner COMB and a plurality of splitters and optical to electrical converters. Each one of the splitters and optical to electrical converters are associated to one of the transceivers TRX1, TRX2 and TRX3. It has to be remarked that FIG. 1 shows the two transceivers TRX1 and TRX2 as receiving transceivers TRXrec1 and TRXrec2 which will be explained in a following paragraph describing the upstream transmission direction. Another remark is that in order not to overload FIG. 1 only the splitter SPL1 and the optical to electrical converter O/E1 associated to the transceiver TRX1 are shown.

The plurality of transceivers TRX1, TRX2 and TRX3 are coupled to the combiner COMB which is coupled to the downstream common link Lc. The first splitter SPL1 and the first optical to electrical inverter O/E1 are coupled to an upstream link and to the transceiver TRX. The functional description of these two blocks will be explained in a further paragraph concerning the upstream transmission direction.

Each transceiver TRX1, TRX2 and TRX3 includes a modulator, a filter and a confirmer. In order not to overload FIG. 1 only the modulator MOD1, the filter FILT1 and the confirmer CONF1 of transceiver TRXrec1 are shown.

Each transceiver TRX1, TRX2 and TRX3 receives information of an asynchronous transfer mode ATM network coupled to the communication access network of the invention. This means that each transceiver TRX1, TRX2 and TRX3 is coupled to this network. In order not to overload the figure, the ATM network is not shown, but the different links to this network are shown in FIG. 1 with vertical arrows ending at the different transceivers TRX1, TRX2 and TRX3.

Each transceiver e.g. TRX1 modulates with the modulator e.g. MOD1 the received information into a predefined frequency band e.g. CH1 and provides thereby a downstream signal e.g. Sd1 to the combiner COMB within this frequency band e.g. CH1.

The combiner COMB receives the information coming from the ATM network via the different transceivers TRX1, TRX2 and TRX3 in different frequency bands CH1, CH2 and CH3 respectively. This means that each transceiver TRX1, TRX2 and TRX3 has its associated frequency band CH1, CH2 and CH3 according to a first association.

In this way, the combiner COMB receives a plurality of downstream signals Sd1, Sd2 and Sd3 and combines the received downstream signals Sd1, Sd2 and Sd3 together in one downstream modulated signal S-MOD which is downstream broadcasted in the communication access network via the downstream link Lc and the tree-like distributive network to the different terminals T11, T12, T13, . . . , T31, . . .

It has to be remarked that in this particular embodiment it is preferred to distribute the downstream modulated signal S-MOD over different physical mediums i.e. electrical and optical. Indeed the downstream modulated signal S-MOD is converted by an electrical to optical converter E/O included in the combiner COMB from an electrical signal into an optical signal just before leaving the head-end HE and is transmitted over optical fibers to the different network terminators NT1, NT2 and NT3. In the network terminators NT1, NT2 and NT3 the optical signal is again converted into an electrical signal by an optical to electrical converter O/E. From the network terminators NT1, NT2 and NT3 the downstream modulated signal S-MOD is further distributed over coaxial cables towards the different terminals T11, T12, T13, . . . , T31, . . . .

A terminal e.g. T12 of the plurality of terminals . . . , T11, T12, T13, . . . , T31, . . . includes an establisher EST, a determiner DET, a transmitter TRANS and a repeater REP. In order not to overload the figure only for terminal T12 these functional blocks are shown. It has to be remarked that these functional blocks are available in all the other terminals and that the following description of the working of the functional blocks is also valid for the other terminals.

The establisher EST is coupled to the determiner DET which is coupled to the transmitter TRANS being coupled to an output of the terminal T12. The repeater REP is also coupled to the establisher EST.

In this embodiment it is preferred to install a memory part (not shown) in each terminal which includes the list of the plurality of frequency bands. According to the second association for each frequency band an upstream frequency band is stored in this memory part.

The establisher EST chooses out of the plurality of frequency bands CH1, CH2, CH3, . . . a start frequency. This choice is established at random. The established start frequency is provided to the determiner DET which determines the associated upstream frequency band according to the second association included in the memory part.

Figure 2:
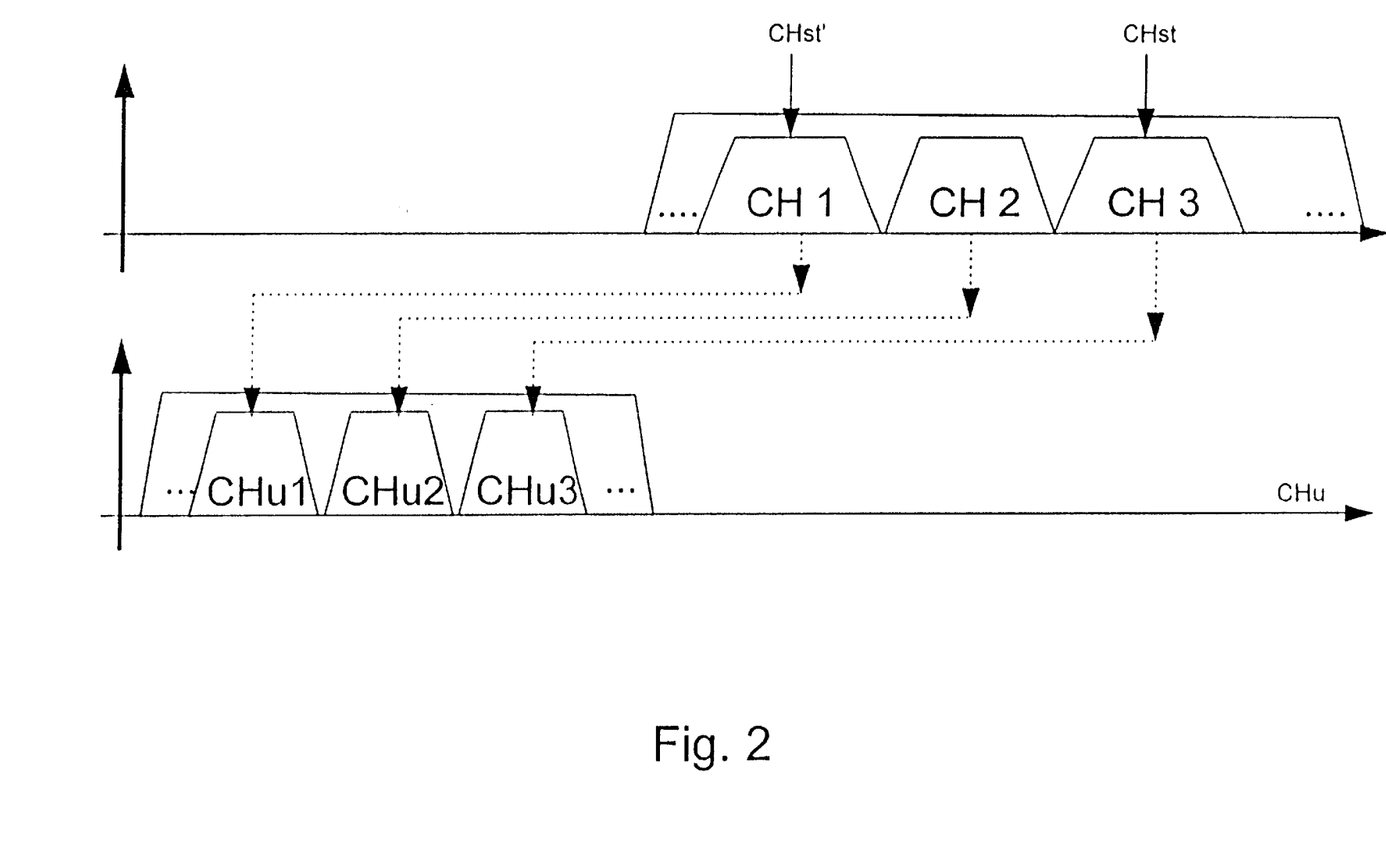
FIG. 2 represent a graph wherein on a frequency line the association between the used downstream and upstream frequency bands is shown.

Referring to FIG. 2 the preferred relation for this embodiment between the frequency bands and the upstream frequency bands is shown. The upper frequency line shows the downstream frequency bands CH1, CH2 and CH3 and the lower frequency line shows the upstream frequency bands CHu1, CHu2 and CHu3. Upon choosing of a frequency band, an upstream frequency band is determined following the dotted lines going from the upper frequency line to the lower frequency line.

Referring back to FIG. 1, once the upstream frequency band is determined, it is provided to the transmitter TRANS which transmits an access request signal AR(T12) within this upstream frequency band. The access request signal includes the identification of the terminal T12 in order to provide the head-end the knowledge that terminal T12 wants to get access to the access system.

Finally, the repeater REP is included in the terminal T12 in order to provide to the establisher a first control signal in the event that a predetermined time has passed from sending the access request signal AR(T12) by the transmitter TRANS without receiving a confirmation signal from the head-end HE. The predetermined time of this embodiment is determined to be two seconds. Upon receiving of this first control signal, the establisher EST knows that an other start frequency has to be chosen and to be provided to the determiner DET.

The communication access network with its links and signals in the upstream direction will be described in further detail in the following paragraphs.

It has to be remarked that all the terminals e.g. T11, T12 and T13 which are coupled to one and the same network terminator NT1 belong to the same domain, called hereafter a Medium Access Controller domain, shortly MAC domain, of this network terminator ONT1.

The different upstream signals of the different terminals of one MAC domain are time division multiplexed in a time division multiple access network terminator as shown in FIG. 1. In order not to overload FIG. 1, only one time division multiple access network terminator TDMA-NT is shown. A time multiplexed electrical signal is provided from the time division multiple access network terminator TDMA-NT to the network terminator NT1. The network terminator NT1 converts this time multiplexed electrical signal to a time multiplexed optical signal with an electrical to optical converter E/O.

Each network terminator e.g. NT1 is upstream coupled with one optical fiber to the head-end HE. In order not to overload FIG. 1 only one upstream link is shown with a dotted line i.e. the upstream link of network terminator NT1 upstream coupled to two receiving transceivers TRXrec1 and TRXrec2 via the associated optical to electrical converter O/E1 and the splitter SPL1. A time multiplexed optical signal is, once received in the head-end HE, again converted into a time multiplexed electrical signal by an optical electrical converter O/E1 and is splitted by a splitter SPL1 in order to be provided to at least one receiving transceiver TRXrec1 and TRXrec2. As already mentioned above, each one of these receiving transceivers, coming out of the plurality of transceivers, receives this time multiplexed electrical signal.

It has to be remarked that since in the upstream direction for one MAC domain, time division multiple access is used and for different MAC domains different upstream links are used, no contamination of packets coming from different terminals will occur.

Each filter e.g. FILT1 included in each transceiver e.g. TRX1 filters out of the time multiplexed electrical signal within a predefined upstream frequency bond CHu1 a filtered signal. It has to be explained that the predefined upstream frequency band CHu1 is determined by a control manager (not shown) included in the head-end HE. The control manager determines the upstream frequency band according to the predetermined first association and the predetermined second association. Indeed following the predetermined first association of transceivers TRX1, TRX2 and TRX3 to frequency bands CH1, CH2 and CH3, respectively; and the predetermined second association of frequency bands CH1, CH2 and CH3 to upstream frequency bands CHu1, CHu2 and CHu3, respectively, an upstream frequency band is determined for each transceiver. The determined upstream frequency band is provided for each transceiver to its filter whereby the filters are tuned following this upstream frequency band. In this way e.g. transceiver TRX1 including filter FILT1 filters the incoming signals transmitted by the terminals with the upstream frequency band CHu1.

The filtered signal is provided to the confirmer CONF1. According to the outlook of the filtered signal, the confirmer CONF1 provides a confirmation signal which is inserted in the downstream signal Sd1.

In the following paragraph the principle working of the method of the invention will be described in further detail on the basis of an example.

Presume a situation that the above described first association and second association are valid and that terminal T12 is willing to get access to the communication access system. The terminal T12 is switched on and the establisher EST establishes a start frequency CHst, chosen at random out of the frequency bands CH1, CH2 and CH3. Presume (see FIG. 2) that frequency band CH3 is chosen. Frequency band CH3 is provided to the determiner DET which determines according to the second association (see FIG. 2) the upstream frequency band CHu3. The upstream frequency band CHu3 is provided to the transmitter TRANS which transmits an access request signal AR(T12) to the head-end. The access request signal AR(T12) which includes the identification T12 of the terminal T12, is in fact modulated into this upstream frequency band CHu3 and transmitted to the head-end HE.

The access request signal AR(T12) is time division multiplexed in the time division multiple access network terminator TDMA-NT with other upstream signals coming from other terminals i.e. T11 and T13 of the same MAC domain. This time multiplexed signal which is an electrical signal is provided to the network terminator NT1. The network terminator NT1 converts the time multiplexed electrical signal into a time multiplexed optical signal with the electrical to optical converter E/O. The time multiplexed optical signal is transmitted over the upstream optical fiber of this MAC domain to the head-end HE. Once arrived in the head-end HE, the time multiplexed optical signal is back converted into the time multiplexed electrical signal with the optical to electrical converter O/E1, is splitted by the splitter SP1 and is provided to the receiving transceivers TRXrec1 and TRXrec2.

The receiving transceiver TRXrec1 filters out of the received time multiplexed electrical signal with the upstream frequency band CHu1, according to the first association and the second association, a filtered signal called a first filtered signal. In a similar way, the receiving transceiver TRXrec2 filters out of the received time multiplexed electrical signal with the upstream frequency band CHu2 a filtered signal called a second filtered signal.

Since the access request signal AC(T12) coming from terminal T12 is modulated in the upstream frequency band CHu3, which is not the upstream frequency band CHu1 and CHu2 used by the receiving transceivers TRXrec1 and TRXrec2, respectively, the first filtered signal and the second filtered signal is not substantially equal to this access request signal AR(T12). The access request signal AC(T12) is in fact suppressed by as well the filter of the receiving transceiver TRXrec1 as the filter of the receiving transceiver TRXrec2 whereby no reaction will be provided on this access request signal AC(T12). No confirmation will be provided to the terminal T12.

After the predetermined time of two seconds from transmitting by the transmitter TRANS the access request signal AR(TL12) without receiving a confirmation from the head-end HE by the terminal T12, the repeater REP provides a first control signal to the establisher EST.

The establisher EST establishes another start frequency CHst', chosen at random out of the frequency bonds CH1 and CH2. It has to be noted here that the previous chosen start frequency band CH3 is stored in the memory part of the terminal T12 whereby this following choice is made only out of the left frequency bands. Presume (see FIG. 2) that frequency band CH1 is chosen as another start frequency CHst'. Frequency band CH1 is provided to the determiner DET which determines according to the second association (see FIG. 2) the upstream frequency band CHu1. The upstream frequency band CHu1 is provided to the transmitter TRANS which transmits again an access request signal AR(TL12) to the head-end HE. The access request signal AR(T12) is modulated into this upstream frequency band CHu1 and transmitted to the head-end HE.

Once received in the head-end and distributed to the two receiving transceivers TRXrec1 and TRXrec2, the received time multiplexed electrical signal is again filtered with the upstream frequency band CHu1 and CHu2, respectively, whereby again a first filtered signal and a second filtered signal is provided.

Since the access request signal AC(T12) coming from terminal T12 is modulated in the upstream frequency band CHu1, which is not the upstream frequency band CHu2 used by the receiving transceiver TRXrec2, the second filtered signal is not substantially equal to the access request signal AR(T12). However, since the access request signal AC(T12) coming from terminal T12 is modulated in the upstream frequency band CHu1 which is the upstream frequency band CHu1 used by the receiving transceivers TRXrec2 whereby the access request signal AR(T12) is not suppressed by the filter of this receiving transceiver TRXec12, the first filtered signal is substantially equal to the access request signal AR(T12) and a confirmation signal is provided to the terminal T12.

The confirmation signal which includes the identification of terminal T12 is generated by the confirmer CONF1 and is inserted in the downstream signal Sd1 of the receiving transceiver TRXrec1. The downstream signal Sd1 is provided to the combiner COMB, combined with the other downstream signals and downstream distributed in the network. Upon receiving of the confirmation signal and upon recognition of its identification T12 in the confirmation signal the terminal T12 knows:

that the access request signal AR(T12) is well received by the head-end HE; and that the frequency band CH1 chosen as actual start frequency band CHst' constitutes the access frequency band; and that the downstream signal Sd1 provided by its access transceiver is modulated within this access frequency band CH1; and that the upstream frequency band CHu1 associated by the second association to the access frequency band CH1 is used by the filter of its access transceiver.

It has to be remarked that the application of the invention is not limited to a hybrid fiber coax communication network as described in the chosen embodiment of the invention. Small modifications, evident to a person skilled in the art, may be applied to the above described embodiment to adapt it to be integrated in other networks wherein information concerning a to be used frequency band has to be provided from a head-end to a terminal. Indeed, in distributive interactive telecommunication networks with the minimum features as the topology of the network described in the introductory part, the present invention is applicable.

While the principles of the invention have been described above in connection with specific apparatus, it is to be clearly understood that this description is made only by way of example and not as a limitation on the scope of the invention, as defined in the appended claims.

What is claimed is:

1. A method to determine an access frequency band in a communication access network, said communication access network including a plurality of terminals (T11, T12, T13, ..., T31, ...) and a head-end (HE) which includes a plurality of transceivers (TRX1, TRX2, TRX3, ...), said head-end (HE) being downstream coupled to each one of said plurality of terminals (T11, T12, T13, ..., T31, ...) via a downstream common link (Lc) and a tree-like distributive network, each one of said plurality of transceivers (TRX1, TRX2, TRX3, ...) providing to a combiner (COMB) included in said head-end (HE) one of a plurality of downstream signals (Sd1, Sd2, Sd3, ...) in one of a plurality of frequency bands (CH1, CH2, CH3, ...) that are associated by means of a predetermined first association to said plurality of transceivers (TRX1, TRX2, TRX3, ...), said plurality of downstream signals (Sd1, Sd2, Sd3, ...) being together combined by said combiner (COMB) into a downstream modulated signal (S-MOD), said downstream modulated signal (S-MOD) being broadcasted from said head-end (HE) to said plurality of terminals (T11, T12, T13, ..., T31, ...), a first one (T12) of said plurality of terminals being upstream coupled to at least one of said plurality of transceivers (TRXrec1, TRXrec2, ...) via a common upstream link and at least one upstream sublink, said access frequency band being one of said plurality of frequency bands (CH1, CH2, CH3, ...) to be used by said first terminal (T12) to filter, out of said downstream modulated signal (S-MOD), one of said downstream signals provided by an access transceiver, said access transceiver being one of said plurality of transceivers (TRX1, TRX2, TRX3, ...), in order to establish a communication between said access transceiver and said first terminal (T12), characterized in that said method includes the steps of:

a) choosing by said first terminal (T12) out of said plurality of frequency bands (CH1, CH2, CH3, ...) a start frequency band (CHst);

b) determining by said first terminal (T12) with said start frequency band (CHst) and according to a predetermined second association, an upstream frequency band (CHu), said upstream frequency band (CHu) being one of a plurality of upstream frequency bands (CHu1, CHu2, Chu3, ...) whereof each one is associated by means of said predetermined second association to one of said plurality of frequency bands (CH1, CH2, CH3, ...);

c) transmitting by said first terminal (T12) within said upstream frequency band (CHu) an access request signal (AR(T12)) to said at least one transceiver (TRXrec1, TRXrec2, ...) to which said first terminal (T12) is coupled;

d) filtering, by said at least one transceiver (TRXrec1, TRXrec2, ...) to which said first terminal (T12) is coupled, incoming signals so as to provide a filtered signal;

e) in the event that said upstream frequency band (CHu) of said first terminal (T12) corresponds to an upstream frequency band (CHu1) used by said at least one transceiver (TRXrec1, TRXrec2 ...) to which said first terminal (T12) is coupled, then said filtered signal corresponds to said access request signal (AR(T12)) and said at least one transceiver (TRXrec1, TRXrec2, ...) to which said first terminal (T12) is coupled constitutes said access transceiver, confirming to said first terminal (T12) by said head-end (HE) that said start frequency band (CHst) constitutes said access frequency band; and f) in the event that after a predetermined time from sending said access request signal (AR(T12)) without receiving said confirmation of said step e), repeating said steps of said method with another start frequency band (CHst').

2. A method to determine an access frequency band according to claim 1, characterized in that said first one (T12) of said plurality of terminals is upstream coupled to all of said plurality of transceivers (TRX1, TRX2, TRX3, ...).

3. A method to determine an access frequency band according to claim 2, characterized in that said access request signal (AR(T12)) is included in an upstream message of a ranging procedure.

4. a method to determine an access frequency band according to claim 3, characterized in that said step f) is realized by including a confirmation signal in a downstream message of a ranging procedure.

5. A head-end (HE) for inclusion in a communication access network and adapted to provide an access frequency band, said head-end (HE) including a plurality of transceivers (TRX1, TRX2, TRX3, ...) and being downstream coupled to each one of a plurality of terminals (T11, T12, T13, ..., T31, ...) included in said communication access network via a downstream common link (Lc) and a tree-like distributive network, each one of said plurality of transceivers (TRX1, TRX2, TRX3, ...) being adapted to provide to a combiner (COMB) included in said head-end (HE) one of a plurality of downstream signals (Sd1, Sd2, Sd3, ...) within one of a plurality of frequency bands (CH1, CH2, CH3, ...) that are associated by means of a predetermined first association to said plurality of transceivers (TRX1, TRX2, TRX3, ...), said combiner (COMB) being adapted to combine said plurality of downstream signals (Sd1, Sd2, Sd3, ...) together into a downstream modulated signal (S-MOD) which is broadcasted from said head-end (HE) to said plurality of terminals (T11, T12, T13, ..., T31, ...), a first one (T12) of said plurality of terminals being upstream coupled to at least one of said plurality of transceivers (TRXrec1, TRXrec2, ...) via a common upstream link and at least one upstream sublink, said access frequency band being one of said plurality of frequency bands (CH1, CH2, CH3, ...) to be used by said first terminal (T12) to filter out, of said downstream modulated signal (S-MOD), one of said downstream signals provided by an access transceiver, said access transceiver being one of said plurality of transceivers (TRX1, TRX2, TRX3, ...), in order to establish a communication between said access transceiver and said first terminal (T12), characterized in that said head-end (HE) further includes:

at least one filter means (FILT1, ...) whereof each one being included in said at least one transceiver (TRXrec1, ...) to which said first terminal (T12) is coupled, to filter out of incoming signals including an access request signal (AR(T12)) within a predetermined one (CHu1) of a plurality of upstream frequency bands (CHu1, CH2, CHu3, ...) according to said predetermined first association means and a predetermined second association means and to provide thereby a filtered signal, said access request signal (AR(T12)) being transmitted by said first terminal (T12) within an upstream frequency band (CHu) to said at least one transceiver (TRXrec1, TRXrec2, ...) to which said first terminal (T12) is coupled, said upstream frequency band (CHu) being one of a plurality of upstream frequency bands (CHu1, CHu2, CHu3, ...) whereof each one is associated by means of said predetermined second association to one of said plurality of frequency bands (CH1, CH2, CH3, . . . ) and being determined by said first terminal (T12) with a start frequency (CHst) chosen by said first terminal (T12) out of said plurality of frequency bands (CH1, CH2, CH3, . . . ) and according to said predetermined second association; and confirmation means (CONF1);

in the event that said upstream frequency band (CHu) corresponds to an upstream frequency band (CHu1) used by said at least one transceiver (TRXrec1, TRXrec2, . . . ) to which said first terminal (T12) is coupled, then said filtered signal corresponds to said access request signal (AR(T12)) and said at least one transceiver (TRXrec1, TRXrec2, . . . ) to which said first terminal (T12) is coupled constitutes said access transceiver, and to confirm to said first terminal (T12) by said head-end (HE) that said start frequency band (CHst) constitutes said access frequency band; and to enable said first terminal, in the event that after a predetermined time from sending by said first terminal (T12) said access request signal (AR(T12)) without receiving said confirmation from said head-end (HE) to choose another start frequency band.

6. A first terminal (T12) for inclusion in a communication access network and adapted to determine an access frequency band, said first terminal (T12) being a first one of a plurality of terminals (T11, T12, T13, . . . , T31, . . . ) included in said communication access network, said communication access network including a head-end (HE) which includes a plurality of transceivers (TRX1, TRX2, TRX3, . . . ) and which is downstream coupled to each one of said plurality of terminals (T11, T12, T13, . . . , T31, . . . ) via a downstream common link (Lc) and a tree-like distributive network, each one of said plurality of transceivers (TRX1, TRX2, TRX3, . . . ) is adapted to provide one of a plurality of downstream signals (Sd1, Sd2, Sd3, . . . ) to a combiner (COMB) included in said head-end (HE) within one of a plurality of frequency bands (CH1, CH2, CH3, . . . ) that are associated to said plurality of transceivers (TRX1, TRX2, TRX3, . . . ) by means of a predetermined first association, said combiner (COMB) being adapted to combine said plurality of downstream signals (Sd1, Sd2, Sd3, . . . ) together into a downstream modulated signal (S-MOD) which is broadcasted from said head-end (HE) to said plurality of terminals (T11, T12, T13, . . . , T31, . . . ), said first terminal (T12) being upstream coupled to at least one of said plurality of transceivers (TRXrec1, TRXrec2, . . . ) via a common upstream link and at least one upstream sublink, said access frequency band being one of said plurality of frequency bands (CH1, CH2, CH3, . . . ) to be used by said first terminal (T12), to filter out of said downstream modulated signal (S-MOD), one of said downstream signals provided by an access transceiver, said access transceiver being one of said plurality of transceivers (TRX1, TRX2, TRX3, . . . ), in order to establish a communication between said access transceiver and said first terminal (T12), characterized in that said first terminal further includes:

establishing means (EST) to choose out of said plurality of frequency bands (CH1, CH2, CH3, . . . ) a start frequency band (CHst);

determining means (DET) to determine with said start frequency band (CHst) and according to a predetermined second association an upstream frequency band (CHu), said upstream frequency band (CHu) being one of a plurality of upstream frequency bands (CHu1, CHu2, CHu3, . . . ) whereof each one is associated by means of said predetermined second association to one of said plurality of frequency bands (CH1, CH2, CH3, . . . ); and transmitting means (TRANS):
to transmit within said upstream frequency band (CHu) an access request signal (AR(T12)) to said at least one transceiver (TRXrec1, TRXrec2, . . . ) to which said first terminal (T12) is coupled; and to enable thereby said at least one transceiver (TRXrec1, TRXrec2, . . . ) to which said first terminal (T12) is coupled, to provide a filtered signal; and in the event that said upstream frequency band (CHu) of said first terminal (T12) corresponds to an upstream frequency band (CHu) used by said at least one transceiver (TRXrec1, TRXrec2, . . . ) to which said first terminal is coupled, then said filtered signal corresponds to said access request signal (AR(T12)) and said at least one transceiver (TRXrec1, TRXrec2, . . . ) to which said first terminal is coupled constitutes said access transceiver, and to enable said head-end (HE) to confirm to said first terminal (T12) that said start frequency band (CHst) constitutes said access frequency band; and repeating means (REP) to provide to said establishing means (EST), in the event that after a predetermined time from sending said access request signal (AR(T12)) without receiving said confirmation from said head-end (HE), a first control signal in order to enable said establishing means (EST) to choose another start frequency band (CHst').

7. A communication access network characterized in that said communication access network includes a head-end (HE) for inclusion in a communication access network and adapted to provide an access frequency band, said head-end (HE) including a plurality of transceivers (TRX1, TRX2, TRX3, . . . ) and being downstream coupled to each one of a plurality of terminals (T11, T12, T13, . . . , T31, . . . ) included in said communication access network via a downstream common link (Lc) and a tree-like distributive network, each one of said plurality of transceivers (TRX1, TRX2, TRX3, . . . ) being adapted to provide to a combiner (COMB) included in said bead-end (HE) one of a plurality of downstream signals (Sd1, Sd2, Sd3, . . . ) within one of a plurality of frequency bands (CH1, CH2, CH3, . . . ) that are associated by means of a predetermined first association to said one of said plurality of transceivers (TRX1, TRX2, TRX3, . . . ), said combiner (COMB) being adapted to combine said plurality of downstream signals (Sd1, Sd2, Sd3, . . . ) together into a downstream modulated signal (S-MOD) which is broadcasted from said head-end (HE) to said plurality of terminals (T11, T12, T13, . . . , T31, . . . ), a first one (T12) of said plurality of terminals being upstream coupled to at least one of said plurality of transceivers (TRXrec1, TRXrec2, . . . ) via a common upstream link and at least one upstream sublink, said access frequency band being one of said plurality of frequency bands (CH1, CH2, CH3, . . . ) to be used by said first terminal (T12) to filter out, of said downstream modulated signal (S-MOD), one of said downstream signals provided by an access transceiver, said access transceiver being one of said plurality of transceivers (TRX1, TRX2, TRX3, . . . ), in order to establish a communication between said access transceiver and said first terminal (T12), characterized in that said head-end (HE) further includes:

at least one filter means (FILT1, . . . ) whereof each one being included in said at least one transceiver (TRXrec1, . . . ) to which said first terminal (T12) is coupled, to filter out of incoming signals including an access request signal (AR(T12)) within a predetermined one (CHu1) of a plurality of upstream frequency bands (CHu1, CH2, CHu3, . . . ) according to said predetermined first association means and a predetermined second association means and to provide thereby a filtered signal, said access request signal (AR(T12)) being transmitted by said first terminal (T12) within an upstream frequency band (CHu) to said at least one transceiver (TRXrec1, TRXrec2, . . . ) to which said first terminal (T12) is coupled, said upstream frequency band (CHu) being one. of a plurality of upstream frequency bands (CHu1, CHu2, CHu3, . . . ) whereof each one is associated by means of said predetermined second association to one of said plurality of frequency bands (CH1, CH2, CH3, . . . ) and being determined by said first terminal (T12) with a start frequency (CHst) chosen by said first terminal (T12) out of said plurality of frequency bands (CH1, CH2, CH3, . . . ) and according to said predetermined second association; and confirmation means (CONF1);
   in the event that said upstream frequency band (CHu) corresponds to an upstream frequency band (CHu1) used by said at least one transceiver (TRXrec1, TRXrec2, . . . ) to which said first terminal (T12) is coupled, then said filtered signal corresponds to said access request signal (AR(T12)) and said at least one transceiver (TRXrec1, TRXrec2, . . . ) to which said first terminal (T12) is coupled constitutes said access transceiver, and to confirm to said first terminal (T12) by said head-end (HE) that said start frequency band (CHst) constitutes said access frequency band; and
   to enable said first terminal, in the event that after a predetermined time from sending by said first terminal (T12) said access request signal (AR(T12)) without receiving said confirmation from said head-end (HE) to choose another start frequency band; and wherein said first terminal (T12) includes:
   establishing means (EST) to choose out of said plurality of frequency bands (CH1, CH2, CH3, . . . ) the start frequency band (CHst);
   determining means (DET) to determine with said start frequency band (CHst) and according to the predetermined second association an upstream frequency and (CHu), said upstream frequency band (CHu) being one of the plurality of upstream frequency bands (CHu1, CHu2, CHu3, . . . ) whereof each one is associated by means of said predetermined second association to one of said plurality of frequency bands (CH1, CH2, CH3, . . . ); and transmitting means (ETANS):
   to transmit within said upstream frequency band (CHu) the access request signal (AR(T12)) to said at least one transceiver (TRXrec1, TRXrec2, . . . ), to which said first terminal (T12) is coupled; and
   to enable thereby said at least one transceiver (TRXrec1, TRXrec2, . . . ) to which said first terminal (T12) is coupled, to provide a filtered signal; and
   in the event that said upstream frequency band (CHu) of said first terminal (T12) corresponds to an upstream frequency band (CHu) used by said at least one transceiver (TRXrec1, TRXrec2, . . . ) to which said first terminal is coupled, then said filtered signal corresponds to said access request signal (AR(T12)) and said at least one transceiver (TRXrec1, TRXrec2, . . . ) to which said first terminal is coupled constitutes said access transceiver, and to enable said head-end (HE) to confirm to said first terminal (T12) that said start frequency band (CHst) constitutes said access frequency band; and repeating means (REP) to provide to said establishing means (EST), in the event that after a predetermined time from sending said access request signal (AR(T12)) without receiving said confirmation from said head-end (HE), a first control signal in order to enable said establishing means (EST) to choose another start frequency band (CHst').

8. A method to determine an access frequency band according to claim 1, characterized in that said access request signal (AR(T12)) is included in an upstream message by of a ranging procedure.

9. A method to determine an access frequency band according to claim 1, characterized in that said step f) is realized by including a confirmation signal in a downstream message of a ranging procedure.

* * * * *

UNITED STATES PATENT AND TRADEMARK OFFICE
CERTIFICATE OF CORRECTION

PATENT NO.     : 6,400,705 B1
DATED          : June 4, 2002
INVENTOR(S)    : R.P.C. Wolters et al.

It is certified that error appears in the above-identified patent and that said Letters Patent is hereby corrected as shown below:

<u>Column 18,</u>
Line 1, "and" should be -- band --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,400,705 B1  
DATED          : June 4, 2002  
INVENTOR(S)    : R.P.C. Wolters et al.

It is certified that error appears in the above-identified patent and that said Letters Patent is hereby corrected as shown below:

Column 18,  
Line 8, "ETANS" should be -- TRANS --.  
Line 41, "by" should be deleted.

Signed and Sealed this

Twenty-eighth Day of January, 2003

JAMES E. ROGAN  
*Director of the United States Patent and Trademark Office*